Figure 14:
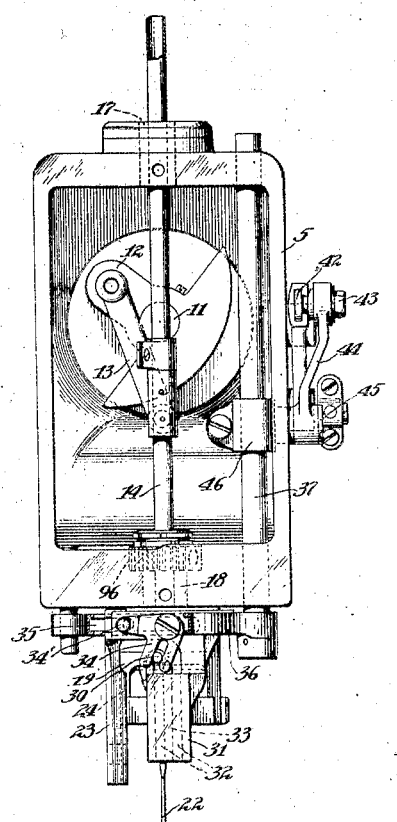

E. B. ALLEN AND H. C. FAULKNER.
STITCH FORMING MECHANISM.
APPLICATION FILED MAR. 13, 1918.
1,372,473.
Patented Mar. 22, 1921.
7 SHEETS—SHEET 1.
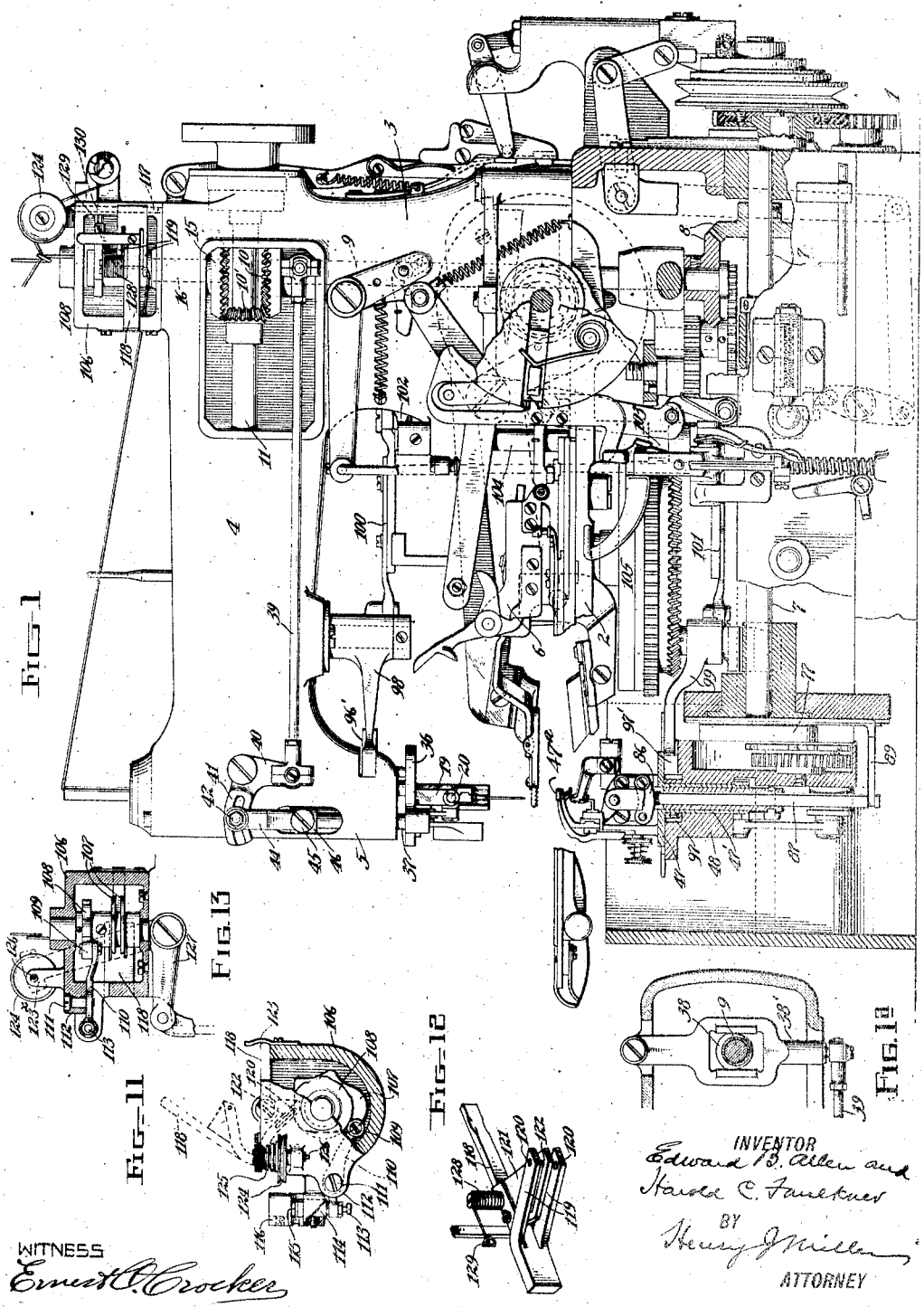
INVENTOR
Edward B. Allen and
Harold C. Faulkner
BY
Henry J. Miller
ATTORNEY
WITNESS
Ernest A. Crocker E. B. ALLEN AND H. C. FAULKNER.
STITCH FORMING MECHANISM.
APPLICATION FILED MAR. 13, 1918.
1,372,473.
Patented Mar. 22, 1921.
7 SHEETS—SHEET 2.
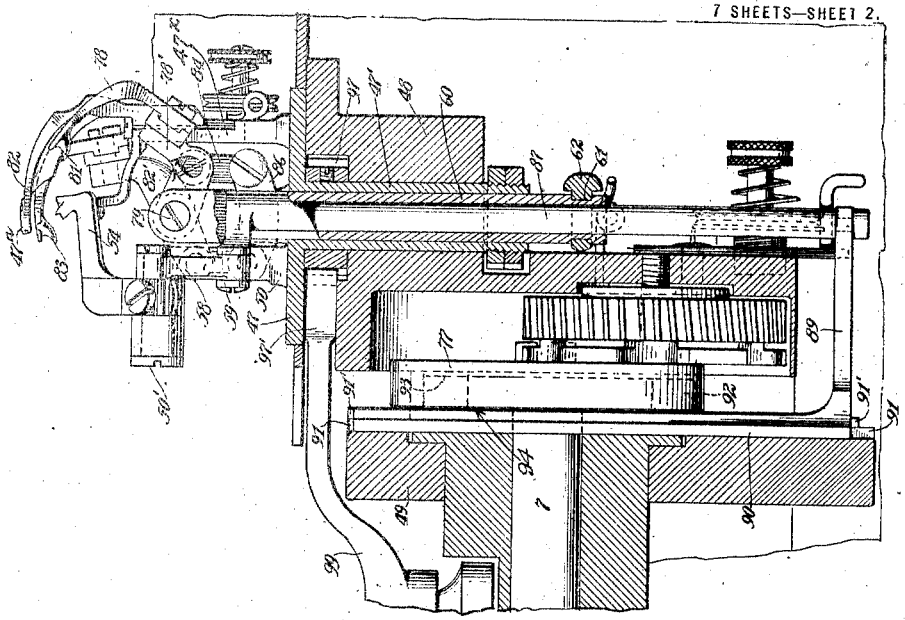
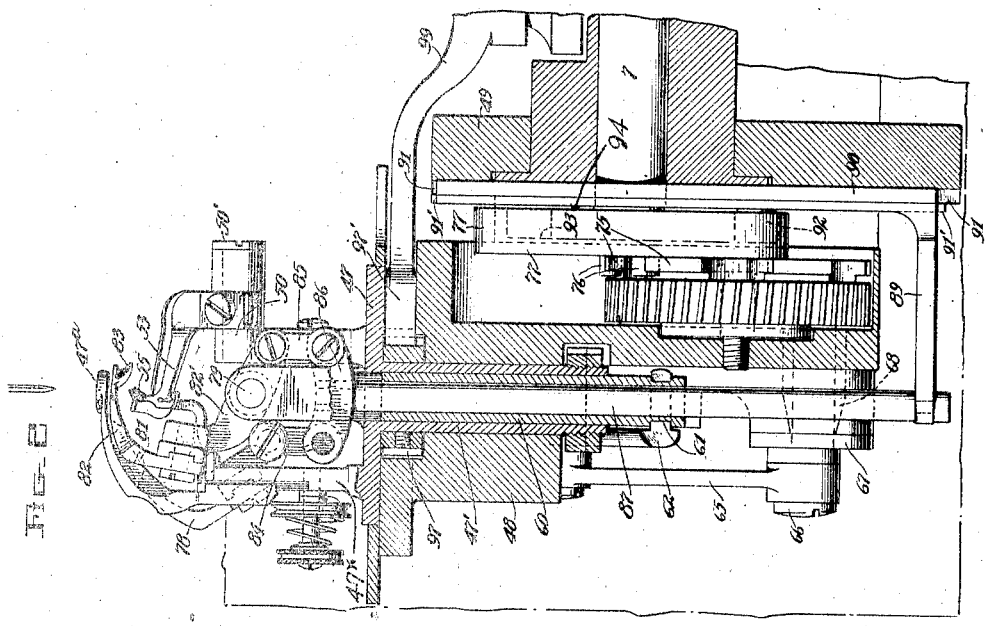
INVENTOR
Edward B. Allen and
Harold C. Faulkner
BY
Henry J Miller
ATTORNEY
WITNESS

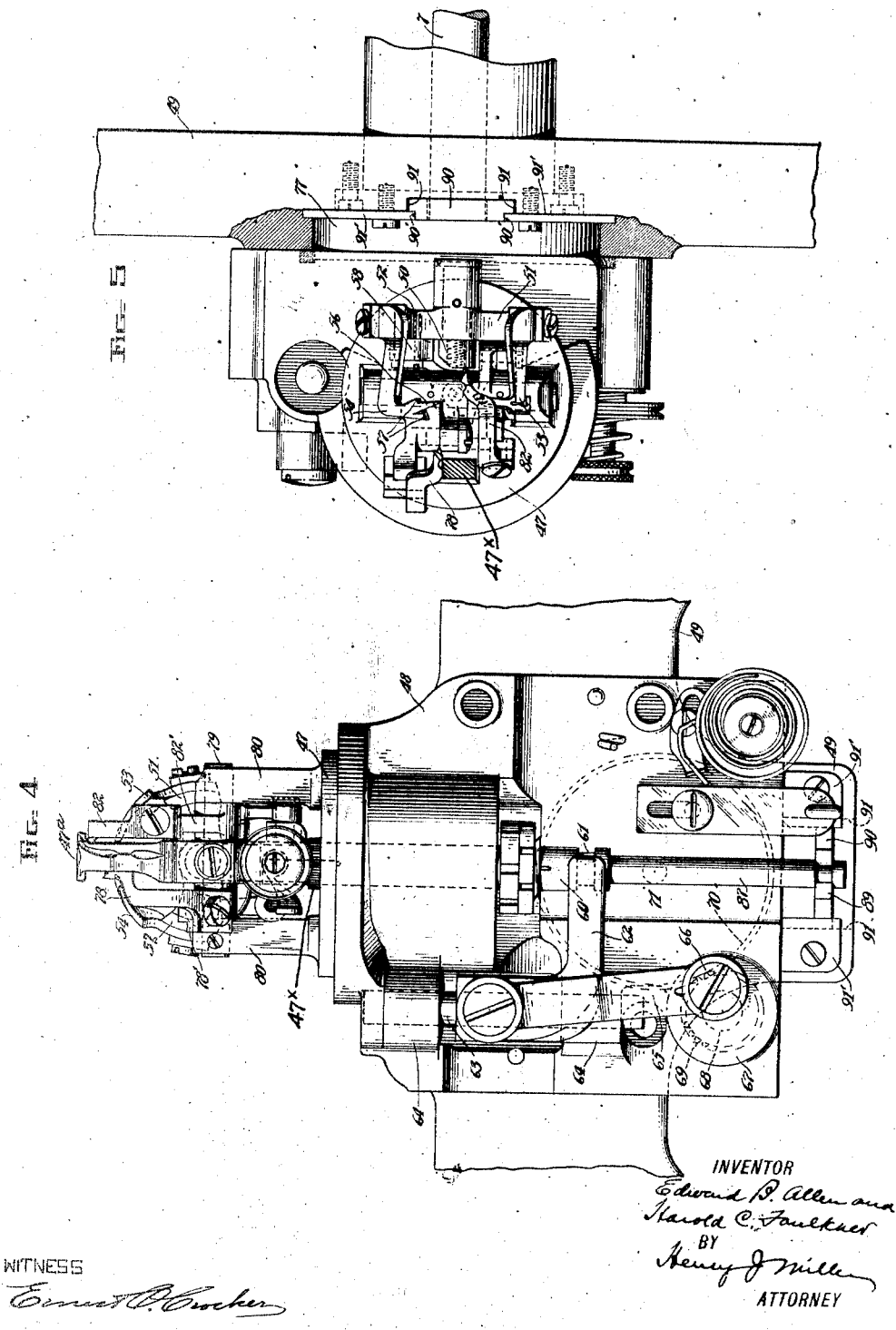

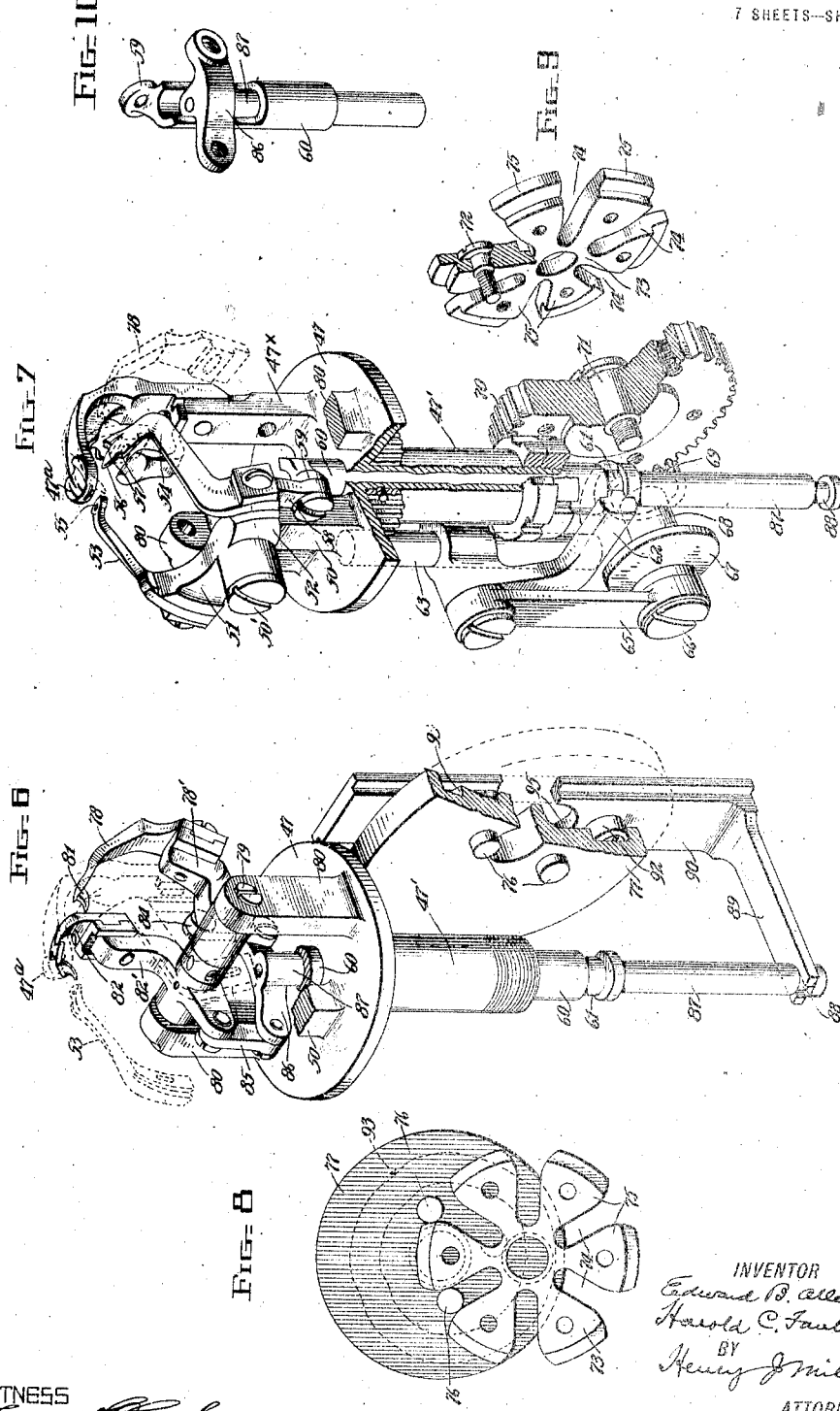

E. B. ALLEN AND H. C. FAULKNER.
STITCH FORMING MECHANISM.
APPLICATION FILED MAR. 13, 1918.

1,372,473.

Patented Mar. 22, 1921.
7 SHEETS—SHEET 5.

WITNESS
Ernest B Crocker

INVENTOR
Edward B. Allen and
Harold C. Faulkner
BY
Henry J Miller
ATTORNEY

E. B. ALLEN AND H. C. FAULKNER.
STITCH FORMING MECHANISM.
APPLICATION FILED MAR. 13, 1918.

1,372,473.

Patented Mar. 22, 1921.
7 SHEETS—SHEET 7.

INVENTOR
Edward B. Allen and
Harold C. Faulkner

BY
Henry J. Miller
ATTORNEY

WITNESS

UNITED STATES PATENT OFFICE.

EDWARD B. ALLEN AND HAROLD C. FAULKNER, OF BRIDGEPORT, CONNECTICUT, ASSIGNORS TO THE SINGER MANUFACTURING COMPANY, A CORPORATION OF NEW JERSEY.

STITCH-FORMING MECHANISM.

1,372,473.   Specification of Letters Patent.   Patented Mar. 22, 1921.

Application filed March 13, 1918. Serial No. 222,071.

*To all whom it may concern:*

Be it known that we, EDWARD B. ALLEN and HAROLD C. FAULKNER, citizens of the United States, residing at Bridgeport, in the county of Fairfield and State of Connecticut, have invented certain new and useful Improvements in Stitch-Forming Mechanisms, of which the following is a specification, reference being had therein to the accompanying drawings.

The present invention is an improvement upon the overseaming stitch-forming mechanism disclosed in the United States Patent to E. B. Allen No. 1,030,046, of June 18, 1912, and is adapted for embodiment more particularly in that class of overseaming stitch-forming mechanism comprising a laterally jogging needle or rectilinearly reciprocating needles for passing upper thread-loops through the work in different substantially parallel paths and two loopers, one of which carries a lower thread, arranged beneath the work and adapted to coöperate each with the needle in one of its lateral positions or with its respective needle (when two of the latter are employed), in conjunction with loop-spreaders coöperating with said loopers for distending thread-loops for passage of thread-loops carried by the needle or needles. The improvement is, however, applicable to other classes of stitch-forming mechanism.

In the operation of the mechanism disclosed in said Allen Patent No. 1,030,046, the depth-stitch needle-loop is seized by a non-threaded looper having a loop-seizing point and a lateral spur defining a notch to receive one limb of the needle-loop and carrying a pivotally mounted loop-spreader formed with an oppositely directed spur affording a lateral notch to receive the other limb of the needle-loop; the looper and loop-spreader acting to seize and distend the depth-stitch needle-loop for entry by the needle in its overedge descent, as shown in Fig. 13 in said patent.

Heretofore, in the use of machines for making overseaming stitches of the type referred to, it has been necessary to provide thread of good quality as considerable strain was imparted to the thread during the stitch-forming cycle and particularly during that portion of the cycle in which the relatively long depth-stitch needle-loop above referred to was being drawn up to the work during the descent of the needle; the reaving of a considerable length of thread while doubled back sharply through the eye of the needle and bent over the edge of the work accompanying the proper drawing up of the loop.

The primary object of the present invention is to provide an improved overseaming stitch-forming mechanism of the class described which will operate successfully at high speed using thread of a poor quality; the thread being handled in such a manner that the loops are drawn up and the stitches properly set without straining the thread to the degree heretofore found necessary.

Another object of the invention is to avoid the excessive reaving of the thread while doubled back through the eye of the needle and over the edge of the work during the drawing up of the primary or depth-stitch needle-loops.

A further object of the invention is to provide means for presenting the depth-stitch needle-loop to the needle at a more favorable angle than heretofore to insure certain entry of said loop by the needle while avoiding undue enlargement of said loop.

Still further, the invention has for an object to provide an improved means for operating the loopers and thread-detainers of the present type of stitch-forming mechanism, whereby harsh cam-actions, such as present in the said Allen construction, may be avoided.

With the above and other objects in view, as will hereinafter appear, there has been provided, in common with the prior construction disclosed in said Allen patent, a threaded looper which passes a loop of lower thread through a loop of upper thread presented beneath the work by the needle, which lower thread-loop is engaged and held by an independently movable loop-detainer while the thread-carrying looper recedes, after which said upper thread-loop is drawn up around the lower thread-loop while the needle is still above the work preparatory to a succeeding descent, so that said upper thread-loop is drawn close to the lower face of the work before the formation of the succeeding or depth-stitch needle-thread loop which is passed through said lower thread-loop and distended for seizure by the second looper.

In the present instance, the depth-stitch needle-loop is seized by a non-threaded looper which, while the needle is rising, carries said loop to one side and deposits it upon the horn of a second loop-detainer preferably movable independently of the loopers and connected to the actuating mechanism for the first-mentioned loop-detainer so that said detainers are moved simultaneously in opposite directions, one being advanced while the other is retracted. While the needle is above the work, the depth-stitch needle-loop is drawn up about the horn of the second mentioned loop-detainer and held by the latter close to the under side of the work and in position for certain entry by the slit-stitch or overedge needle-loop, after which the second mentioned detainer is retracted to release the depth-stitch needle-loop so that it may be readily drawn up the remaining short distance to the under side of the work without undue reaving of the thread about the edge of the work or through the needle-eye.

In the present instance, the recession of the non-threaded looper from advanced position while the needle is on its up stroke, permits the needle-loop to be easily drawn up about the second loop-detainer; the needle-thread not being doubled back upon itself and bent sharply about the eye of the needle at this time. The present construction therefore effects a material reduction in the size of the needle-loop prior to the descent of the needle for entry therein and, as a result, this loop may be subsequently drawn up the remaining short distance to the under side of the work with an application of but little tension to the needle-thread.

From the nature of the present improvement, as above set forth, it will be observed that the same is not limited to any particular type of stitch-forming mechanism, but is applicable to any of such mechanisms for producing plural-thread seams. As herein specifically shown and described, it is particularly adapted for embodiment in the stitch-forming mechanism referred to in connection with the pending application of E. B. Allen, Serial No. 179,139, filed July 7, 1917. By suitable modification, however, such as would readily suggest itself to those skilled in the art, the present invention is adapted for embodiment in the classes of overseaming mechanism comprising a plurality of out-of-time needles in conjunction with a looper for taking thread-loops from one needle and presenting them for entry by the other needle.

Figure 15:
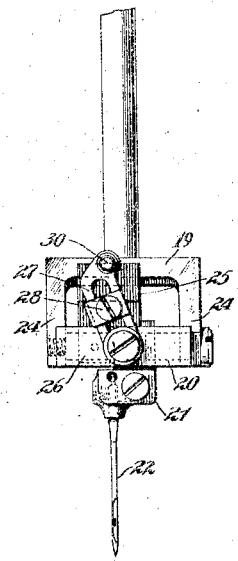
Figure 16:
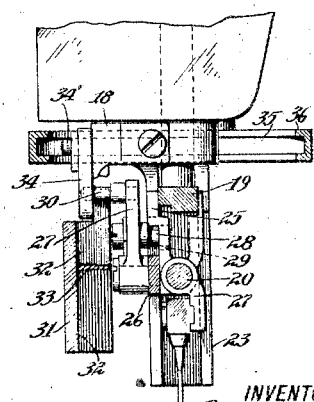
Figure 18:
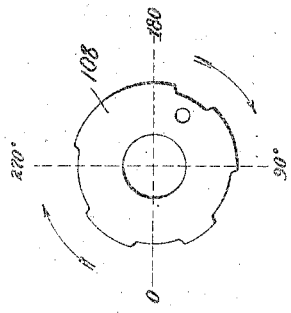
Figure 17:
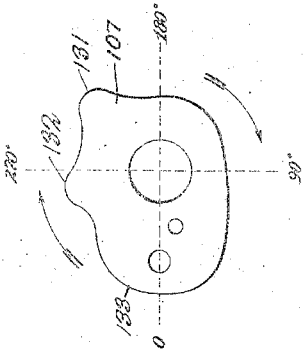
Figure 19:
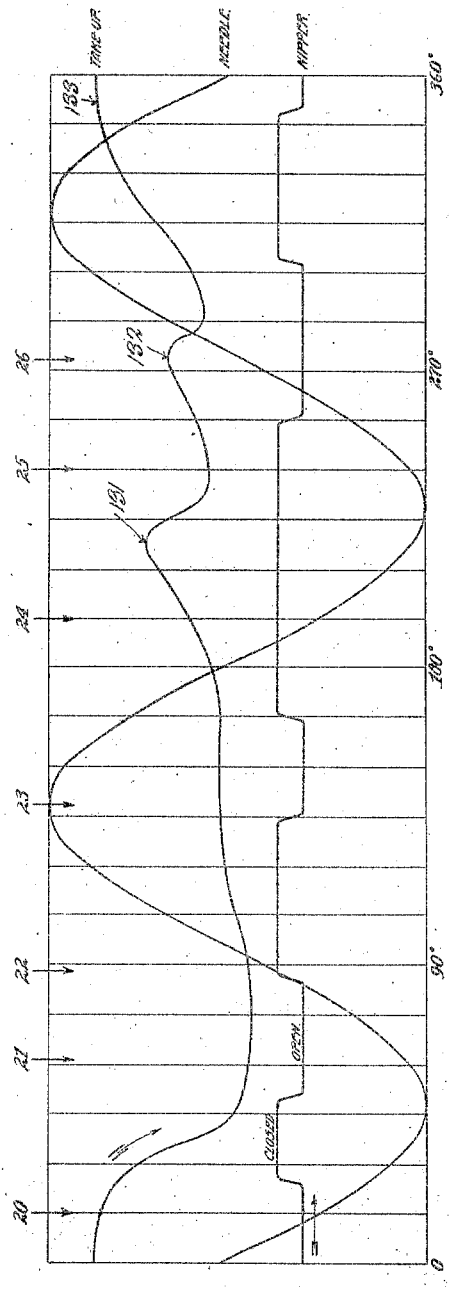

In the accompanying drawings, Figure 1 is a side elevation of a buttonhole sewing machine embodying the invention, a part of the bed being broken away to show the looper mechanism housed therein. Fig. 1ª is a detail view of an element of the needle-jogging mechanism shown in Fig. 1. Fig. 2 is an elevation, partly in section, of the looper mechanism from the same side as in Fig. 1 but on a larger scale. Fig. 3 is a reverse side elevation, partly in section, of the mechanism shown in Fig. 2. Fig. 4 is a front elevation of the looper mechanism and Fig. 5 is a top plan view of the same. Fig. 6 is a detail perspective view of the actuating devices for the loop-detainer. Fig. 7 is a detail perspective view of the actuating devices for the threaded and non-threaded loopers. Figs. 8, 9 and 10 show details of the looper and loop-detainer actuating mechanisms. Figs. 11, 12 and 13 illustrate details of construction of the needle-thread take-up and nipping mechanism. Figs. 14, 15 and 16 illustrate details of construction of the needle-jogging mechanism of the machine in which the invention has preferably been embodied. Fig. 17 is a plan view of the rotary take-up or thread-controller for the needle-thread. Fig. 18 is a plan view of the nipper-actuating cam. Fig. 19 is a diagram illustrating the relative timing of the rotary take-up and nipper. Figs. 20 to 26 inclusive, are perspective views showing diagrammatically and on an enlarged scale various stages of the operation of the loop-handling members of the present stitch-forming mechanism.

As disclosed in said Allen pending application, the frame of the machine is constructed with the hollow rectangular base 1 including the bed-plate 2 from which rises the standard 3 of the bracket-arm 4 terminating in the hollow head 5. The bed-plate 2 supports the usual traveling work-clamp 6 to which longitudinal feeding and sidewise shifting movements are imparted for spacing the overseaming stitches of a buttonhole. The main or driving shaft 7 is journaled within and longitudinally of the base 1 and is connected by means of bevel-gears 8 of one-to-one ratio to a vertical shaft 9 which transmits rotary motion through one-to-two speed-multiplying bevel gears 10, 10' to the needle-bar actuating shaft 11 which carries a crank 12 at its forward end connected in the usual manner by means of a link 13 to the tubular needle-bar 14. Directly above and opposed to the bevel gear 10 is a similar gear 15 which also meshes with the gear 10' and is fixed to the lower end of the take-up shaft 16 journaled in alinement with the shaft 9. It will be readily understood that the gears 10, 10' and 15 are so related as to cause the shafts 9 and 16 to rotate at the same speed but in opposite directions, while the needle-driving shaft 11 will be driven at double the speed of the upright shaft 9 and main-shaft 7.

In general construction and arrangement of parts the needle-actuating mechanism of the present improvement is substantially the same as that disclosed in the U. S. patent to E. B. Allen No. 1,161,277, of November 23, 1915, the tubular needle-bar 14 being journaled in the upper and lower bearings afforded, respectively, by the bushing 17 and the usual rotary sleeve 18 through which turning movements are imparted to the needle in stitching around the eyelet end of the buttonhole. The needle-bar 14 sustains at its lower end the yoke 19 carrying a cross-pin 20 on which is mounted for sliding movements the jogging needle-block 21 carrying the eye-pointed needle 22. Depending from the rotary sleeve 18 is an arm 23 slotted to receive and guide one of the arms 24 of the yoke 19 and serving to transmit the rotary motion of the sleeve to the needle-bar and the parts carried thereby. The needle-block 21 includes a pair of spaced upwardly extending plates 25 which bear against the opposite side faces of the horizontal bar-member of the yoke 19, as shown in Fig. 16 and prevent turning of the needle-block 21 about the cross-pin 20. The lower ends of the arms 24 of the yoke 19 are further connected by a plate 26 to the front side of which is pivoted the lower end of the lever 27 slotted longitudinally to receive an adjustable pin 28 extending rearwardly into a vertical slot 29, Fig. 16, in the forwardly disposed plate-member 25 of the laterally jogging needle-block. The upper extremity of the lever 27 carries a lateral pin 30 which, when shifted sidewise, acts through the lever 27 and pin 28 to slide the needle-block 21 upon the cross-pin 20.

Depending from the rotary sleeve 18 is a guide-block 31 formed with two vertical runways 32 for the pin 30, said runways being separated by the central rib 33. Pivoted to the rotary sleeve 18 is a switch-lever 34 having a slotted arm adapted to receive the pin 30 as it rises from one of the runways 32 and shift it over into position for descent into the other of said runways, thus jogging the needle laterally. The switch-lever 34 carries a lateral pin 34' which enters the inwardly opening annular groove 35 in the ring 36 concentric with the rotary sleeve 18 and sustained by the usual needle-jogging rod 37 journaled in the head 5 for vertical movement. The needle-jogging rod 37 is actuated by means of a cam 38, Fig. 1ª, mounted upon the vertical shaft 9 and embraced by a follower lever 38' the extremity of which is connected by a link 39 to one arm 40 of a bellcrank-lever the other arm 41 of which is formed with an under cut slot to receive the headed pin 42 secured in adjusted position in said slot by means of the nut 43. A link 44 serves to connect the pin 42 with a lateral screw-pin 45 sustained by a collar 46 clamped to the rod 37. By the connections just described the cam or eccentric 38 imparts to the needle a lateral reciprocation for each two longitudinal reciprocations of the needle.

The lower thread-handling implements are sustained by a rotary turret 47 the tubular shank 47' of which is journaled in a vertical bearing aperture in the frame-block 48 detachably secured to a transverse brace 49 within the hollow base 1. Extending upwardly from the turret 47 is a post 50 into the upper extremity of which is threaded a lateral screw-pin 50' upon which is fulcrumed a looper-carrier formed with oppositely extending arms 51 and 52 to which are rigidly secured the threaded and non-threaded loopers 53 and 54, respectively. The threaded-looper 53 is provided adjacent its point with a thread-eye 55 and the non-threaded looper 54 is formed with a loop-seizing beak 56 at the opposite sides of the base of which are formed loop-arresting shoulders 57.

The actuating connections for the loopers 53 and 54 comprise the link 58 secured at its upper end to the arm 52 of the looper-carrier and at its lower end to the offset boss 59 formed at the upper end of the tubular rod 60 fitted to slide within the tubular shank 47' of the turret. The tubular rod 60 is formed at its lower end with a circumferential groove 61 which is embraced by the forked extremity of an arm 62 fixed to a guide-rod 63 journaled to slide vertically in bearing lugs 64 formed on the frame-block 48. The arm 62 is thus adapted to lift and lower the tubular rod 60 and rock the looper-carrier 51, 52 about the fulcrum-pin 50'. Connected to the arm 62 is the upper end of a link 65 the lower end of which is connected to a crank-pin 66 carried by a crank-disk 67 at the forward end of the short shaft 68 which extends through a suitable aperture in the frame-block 48 and at its opposite end carries a pinion 69. Meshing with the pinion 69 is a gear 70 of triple its size mounted upon the screw-pin 71 tapped into the rearwardly recessed face of the frame-block 48. Secured to the rearward face of the gear 70 by means of a series of screws 72 is a star-wheel 73 formed with six radial slots 74 having widened outer extremities and defining six radial teeth 75. The crank-pin is thus geared to the star-wheel to rotate at a speed equal to the speed of the star-wheel multiplied by one-half the number of teeth of the latter.

Step-by-step turning movements are imparted to the star-wheel 73 by means of a pair of driving pins 76, 76, Fig. 8, arranged diametrically of a driving disk 77 and at equal distances from the center or axis of rotation of the disk. It will be observed that the outer ends of the teeth 75 are rounded away in such wise as to produce periods of appreciable dwell between the periods of motion of the star-wheel. During these periods of dwell the crank-pin 66 is held substantially stationary at one or the other of its positions midway between its extreme up and down positions, as shown in Fig. 4, to arrest the motion of the loopers midway between the extremes of their strokes, Figs. 2 to 5 inclusive, to avoid interference with the loop-detainers to be described. The driving disk 77 is mounted on the front end of the main-shaft 7.

Coöperating with the threaded looper 53 is a loop-detainer 78 mounted upon a carrier-lever 78', preferably of the second order, fulcrumed to oscillate about the horizontal pin 79 sustained at its opposite extremities by the posts 80 extending upwardly from the turret 47. At its free end the loop-detainer 78 is formed with a curved and pointed loop-seizing horn 81. Coöperating with the non-threaded looper 54 is a second loop-detainer 82 mounted upon a carrier-lever 82' preferably of the first order and fulcrumed upon the pin 79. The second detainer 82 is formed at its free end with a curved and pointed loop-seizing horn 83. Connected to the loop-detainers 78 and 82, at opposite sides of the fulcrum-pin 79, are the links 84 and 85, respectively, which at their lower ends are connected to the cross-head 86 at the upper end of the rod 87 slidingly fitted within the tubular arm 60. By a lever of the first order is meant one wherein the fulcrum is located between the power and the load and by a lever of the second order is meant one wherein the power is applied between the fulcrum and the load. At its lower end the rod 87 is grooved circumferentially at 88 to receive the forked extremity of an actuator arm 89 projecting forwardly from a slide-plate 90 fitted to the slideways 91 in the transverse brace 49 and carrying a cam roll 92, Fig. 6, entering the cam groove 93 cut in the rearward face 94 of the driving disk 77. The slide-plate 90 is formed with a vertical slot 95 to clear the main-shaft 7 and with grooves 90' for the retainer gibs 91' which are secured to the brace member 49 and form the front side walls of the guideways 91, as shown in Figs. 4 and 5.

The usual throat-plate or button 47ª is fixed to the post 47ˣ carried by the turret 47 and lies directly above and very close to the path of movement of the detainer-horns 81 and 83 which, it will be observed, operate at an elevation intermediate the loopers and the throat-plate.

The mechanism for rotating the stitch-forming mechanism in stitching around the eyelet-end of a buttonhole is constructed substantially in accordance with the disclosure of said Allen pending application or the United States patent to E. B. Allen No. 1,162,207, of November 30, 1915. Meshing with the pinions 96, 97, carried by the rotary sleeve 18 and turret 47, respectively, are similar gear-segments 96', 97', formed on the bellcrank-levers 98, 99 connected, respectively, by links 100, 101 to lateral arms 102, 103 fixed to a vertical shaft 104. The lower of the lateral arms is actuated by the feed-wheel 105 through the usual cam and follower connection, (not shown).

The needle-thread controlling devices provided for the present machine are constructed substantially in accordance with the disclosure of said Allen pending application. In the present instance, the vertical take-up shaft 16 is journaled within the housing 106 screwed to the top of the bracket-arm and has fixed thereto the spaced parallel take-up cam-plates 107 and the thread-nipper actuating cam 108 which is engaged by the follower 109 at the forward extremity of the lever 110 pivoted at 111 to a lug 112 on the housing 106 and, at its rearward end, carrying an adjustable push-screw 113 the extremity of which bears against the outwardly spring-pressed nipper-pin 114 to force the latter into nipping relation with the stationary abutment-piece 115 socketed within the apertured ear 116 formed on the housing 106.

Pivoted upon the vertical pin 117, Fig. 1 is a manually shiftable bar 118 formed with inwardly extending spaced arms 119, Fig. 12, the extremities of which are provided with thread-guiding apertures 120 which, when the lever 118 is in operative position, lie one above and one below the take-up plates 107. Secured to the lever 118 is a stripper-plate 121 formed with a thread-slot 122 whose innermost extremity registers with the thread-guiding apertures 120. The stripper-plate is disposed at a level intermediate the take-up cam-plates 107. The spring 123, which coacts with the end of the lever 118 to yieldingly retain the latter in operative position, permits said lever to be readily shifted to dotted line or threading position, Fig. 11. The take-up cam-plates are shaped to closely control the needle-thread while meeting the thread requirements of the loop-taker mechanism, as will be more fully explained. Mounted upon a vertical lug 123ˣ formed externally of the housing is a tension device of well known form, comprising the separable tension-disks 124 normally pressed together by means of the spring 125, which, at times, is rendered ineffective by means of the tension-disk separating pin 126 actuated by the usual tension-releasing cam-lever 127.

A slack-thread controller or check-spring 128 having a thread-eye 129 is mounted on the bar 118 in position to engage the lead of thread between the guide aperture 130 at the rear of the housing 106 and the upper of the guide-eyes 120. The office of this spring is primarily to control the thread during the first part of the down-stroke of the needle to keep it from catching on the needle point.

In the operation of the present stitch-forming mechanism the pin and star-wheel drive for the loopers 53 and 54 causes the latter to execute rapid advancing and retracting movements alternately and in opposite directions from their mid-positions wherein they are caused to dwell as the driving pins 76 are entering and emerging from the widened outer extremities of the radial slots 74 in the star-wheel 73. This driving mechanism holds the loopers under positive control at all times and causes the loopers to execute their required movements swiftly and smoothly, thus avoiding the necessity for harsh cam actions such as heretofore required.

Before describing a cycle of operations of the stitch-forming mechanism, attention is called to Fig. 19 wherein the relative positions of the needle, take-up and thread-nipper, are shown in diagram throughout a complete cycle. The positions lengthwise of the diagram indicated by the vertically disposed arrows and numerals 20 to 26, inclusive, correspond respectively, with the periods of the stitch-forming cycle indicated in Figs. 20 to 26, inclusive.

Figure 20:
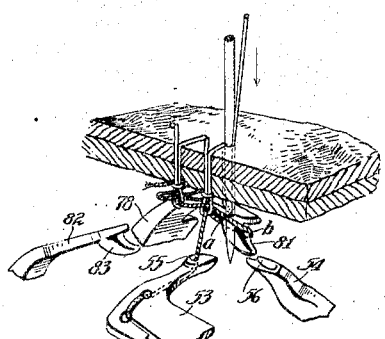
Figure 21:
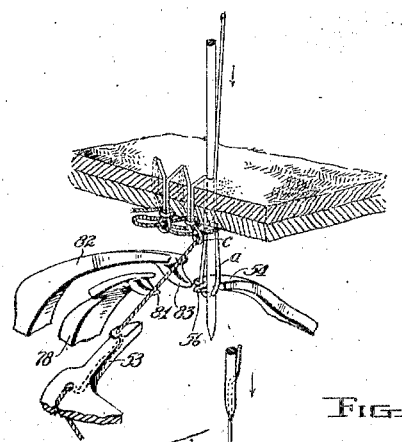

Referring now to Figs. 20 and 21, as the needle descends to form the depth-stitch, it passes the primary or depth stitch needle-loop $a$ through the loop $b$ of looper-thread presented to the needle by the horn 81 of the loop-detainer 78. At this time the take-up is giving up thread to the needle as the needle-eye doubles the thread through the work. After the needle has entered well into the looper-loop $b$ the detainer 78 retreats to shed the looper-loop. Before the needle reaches the end of its down-stroke the thread-nipper is closed so that the needle will set up its previous slit-stitch loop $c$ a little tighter than it was left by the take-up during the preceding cycle.

Figure 22:
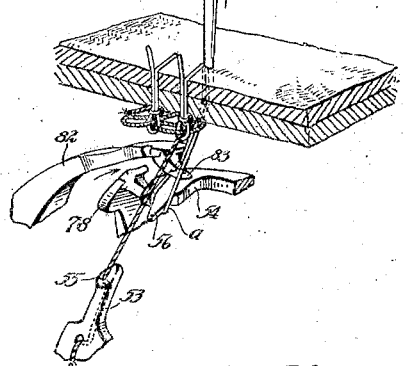
Figure 23:
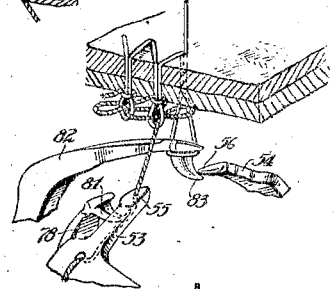

As the needle starts to rise, the thread-nipper releases the thread and the needle throws out its loop $a$, Fig. 21, which is seized by the point 56 of the non-threaded looper 54 and drawn out to one side, Fig. 22; the check spring 128 yielding some thread at this time. Meanwhile the second loop-detainer 82 has been advanced so that the point of its horn 83 detains one limb of the primary loop $a$ while the other limb of said loop is being carried across and in front of the point of said horn by the advance of the non-threaded looper. During the retraction of the non-threaded looper, which follows immediately after its advance to the position shown in Fig. 22, the loop $a$ is shed and quickly drawn up about the widened base of the horn 83 by the recovery of the relatively weak check-spring 128. The loop $a$ is thus positioned close to the under surface of the work and is held in spread condition in the path of the needle as the latter descends to form the overedge- or slit-stitch. In its next descent the needle passes down close beside the horn 83 and into the loop $a$ which is held in a more nearly horizontal plane than in the prior construction disclosed in said Allen Patent No. 1,030,046 wherein a spreader was pivoted upon the non-threaded looper and acted to draw one limb of the needle-loop toward a vertical position, thus making it necessary for the needle to pass between the limbs of the loop while held more nearly vertical and at a less favorable angle than at present.

Figure 24:
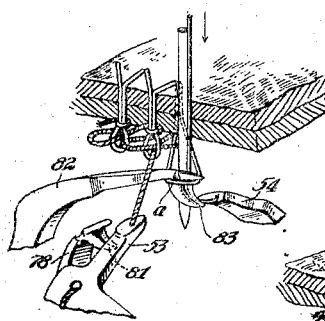
Figure 25:
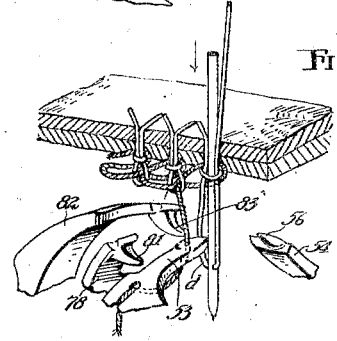
Figure 26:
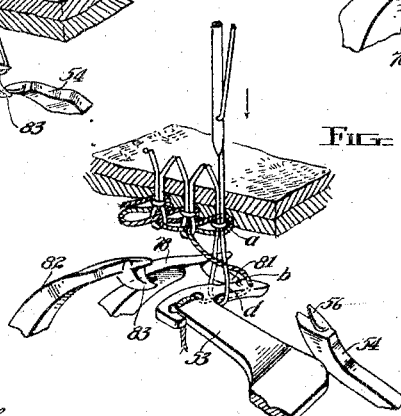

After the needle has entered well into its previous loop $a$, Fig. 24, the second detainer 82 retreats and, as the needle descends, the peak 131 of the take-up draws upon the now relatively short loop $a$ to set it up a little closer to the work, as shown in Fig. 25, but not tightly about the blade of the needle. This, of course, is accomplished with but little strain upon the thread.

As the peak 131 of the take-up passes the guide aperture 120 the check-spring, in recovering, absorbs the amount of thread given up by the take-up and leaves the thread free from strain as the needle rises, Fig. 25, to throw out the slit-stitch or secondary loop $d$. The threaded looper 53 now advances quickly from mid-position and passes a new loop $b$ of looper-thread through the secondary loop $d$ of needle-thread. The loop-detainer 78 next advances to seize the new loop $b$ of looper-thread and remove it from the looper as the latter retracts; the detainer 78 then acting alone to present the looper loop to the needle, as shown in Fig. 20. While the needle-loop $d$ is about the relatively broad shank of the threaded looper and the needle lies above the work, Fig. 26, a second peak 132 of the take-up comes into action to tighten the previous needle-loop $a$ still further; the thread-nipper being open at this time to permit the tension device to control the needle-thread.

It will be observed that the needle-eye is out of the work at this time and the strain of finally setting up the loop $a$ is not exerted upon the thread while it is bent sharply about the needle-eye below the work as in the said prior construction but, on the contrary, while the needle-thread is bent around the relatively broad shank of the threaded looper. For this reason the loop $a$ can be set up while the needle-thread is under less tension than heretofore and, furthermore, the thread is not so apt to break as when strained about the eye of the needle. Upon the retraction of the threaded looper from the position shown in Fig. 26, the hump 133 of the take-up acts to draw up the needle-loop $d$ about the limb of the looper loop $b$, as shown in Fig. 20. This completes a stitch-forming cycle.

Although the invention has been shown and described as applied to a buttonhole sewing machine, it is to be understood that it may be used to advantage in other types of sewing machines having characteristics of construction differing widely from those of buttonhole machines.

Having thus set forth the nature of the invention, what we claim herein is:—

1. Overseaming stitch-forming mechanism comprising, the combination with means operating successively in each stitch-forming cycle to pass primary and secondary thread-loops, respectively, through the work in different paths and a plurality of loopers coöperating with said means, of a plurality of loop-detainers acting successively in each stitch-forming cycle to seize and detain thread-loops presented by said loopers and position said loops unassisted by said loopers for entry by said means.

2. Overseaming stitch-forming mechanism comprising, the combination with a reciprocating and laterally jogging needle operating in each stitch-forming cycle to pass primary and secondary thread-loops, respectively, through the work in different paths and a plurality of loopers coöperating with said needle, of a plurality of loop-detainers acting successively in each stitch-forming cycle to seize and detain thread-loops presented by said loopers and position said loops unassisted by said loopers for entry by said needle.

3. Overseaming stitch-forming mechanism comprising, the combination with reciprocatory means operating successively in each stitch-forming cycle to pass primary and secondary thread-loops, respectively, through the work in different paths and a pair of loopers coöperating with said means, of a pair of pivoted loop-detainers mounted on axes transverse to the paths of movement of said reciprocatory means for seizing thread-loops from said loopers, and actuating means for said detainers comprising an actuating element and connections between said element and said detainers for causing the latter to advance to loop-seizing position in alternation.

4. Overseaming stitch-forming mechanism comprising, the combination with means operating successively in each stitch-forming cycle to pass primary and secondary thread-loops, respectively, through the work in different paths and a pair of loopers coöperating with said means, of a pair of loop-detainers having beaks extending in the same general direction for seizing thread-loops from said loopers, and actuating means for said detainers comprising an actuating element and connections between said element and said detainers for causing the latter to move simultaneously in opposite directions.

5. Overseaming stitch-forming mechanism comprising, the combination with means operating successively in each stitch-forming cycle to pass primary and secondary thread-loops, respectively, through the work in different paths and a pair of loopers coöperating with said means, of a pair of loop-detainers for seizing thread-loops from said loopers, and actuating means for said loopers and detainers comprising a main-shaft and mutually independent lines of operative connections from said shaft to said loopers and detainers, respectively.

6. Stitch-forming mechanism for sewing machines comprising, in combination, a reciprocating needle, a non-threaded looper for seizing a needle-loop, and a loop-detainer movable between said non-threaded looper and the work for seizing and removing the needle-loop from said looper and positioning it nearer the work for entry by the descending needle.

7. Overseaming stitch-forming mechanism for buttonhole sewing machines comprising, in combination, a throat-plate, a reciprocating and laterally jogging needle, a non-threaded looper for seizing a depth-stitch needle-loop below the throat-plate, and a loop-detainer movable between the looper and throat-plate for seizing and removing said depth-stitch needle-loop from the looper and positioning it nearer the under surface of the work for entry by the needle in its slit-stitch descent.

8. Overseaming stitch-forming mechanism comprising, the combination with means operating successively in each stitch-forming cycle to pass primary and secondary thread-loops, respectively, through the work in different paths, a pair of loopers having oppositely directed loop-seizing beaks adapted to enter said thread-loops, and looper-actuating mechanism including a pin and star-wheel drive for effecting loop-seizing and loop-shedding movements of said loopers interspersed by periods of dwell during the descent of said means.

9. Loop-detainer mechanism for overseaming sewing machines comprising, a support, loop-detainer levers of the first and second order, respectively, fulcrumed on said support, a driving element movable toward and from said levers and connections between said element and said levers for rocking the latter simultaneously in opposite directions.

10. Overseaming stitch-forming mechanism comprising, the combination with means operating successively in each stitch-forming cycle to pass primary and secondary thread-loops, respectively, through the work in different paths, independently movable thread-engaging devices coöperating therewith and driving means for said devices comprising a shaft, a cam carried by said shaft, driving pins mounted on said cam, a cam-follower acted upon by said cam and connected to one of said thread-engaging devices, and a star-wheel coöperating with said driving pins and connected to another of said thread-engaging devices.

11. In a sewing machine, in combination, a reciprocating needle, a looper for seizing thread-loops from said needle, and actuating means for said looper including a pin- and star-wheel drive for producing relatively rapid operative movements of said looper interspersed by periods of dwell.

12. In a sewing machine, in combination, a reciprocating needle, a rotary turret, thread-loop handling elements mounted on said turret, means for turning said needle and turret, cam-actuated means for driving certain of said elements, and a pin- and star-wheel drive for others of said elements.

13. Overseaming stitch-forming mechanism comprising, the combination with means operating successively in each stitch-forming cycle to pass primary and secondary thread-loops, respectively, through the work in different paths, loop-detaining devices, a pair of loopers movable alternately in opposite directions to seize thread-loops presented by said means, and actuating means for said loopers including a pin- and star-wheel drive for causing said loopers to dwell intermediate their operative movements.

14. Overseaming stitch-forming mechanism comprising, the combination with means operating successively in each stitch-forming cycle to pass primary and secondary thread-loops, respectively, through the work in different paths, loop-detaining devices, a pair of loopers movable alternately in opposite directions to seize thread-loops presented by said means, and actuating means for said loopers including a crank, a star-wheel having a plurality of teeth and connected to rotate said crank at a speed equal to the speed of rotation of said star-wheel multiplied by half the number of teeth thereof, a main driving shaft, and means carried by said shaft and coöperating with said teeth to impart to the star-wheel in intermittent turning movement.

15. Stitch-forming mechanism for sewing machines comprising, a reciprocating and laterally jogging needle, a plurality of loopers coöperating with said needle and movable in planes substantially parallel with the plane of lateral jogging movements of said needle, and a plurality of loop-detainers for seizing and removing thread-loops each from a respective one of said loopers and movable in planes transverse to the plane of lateral jogging movement of said needle.

16. Stitch-forming mechanism for buttonhole sewing machines comprising, in combination, a reciprocating and laterally jogging needle, a non-threaded looper for seizing a depth-stitch needle-loop, and a loop-detainer having a downwardly extending horn adapted to receive said depth-stitch needle-loop from said non-threaded looper and position said loop unassisted by said looper for entry by said needle in its slit-stitch descent.

17. Overseaming stitch-forming mechanism comprising, the combination with means operating successively in each stitch-forming cycle to pass primary and secondary thread-loops, respectively, through the work in different paths and a plurality of loopers coöperating with said means, of a plurality of loop-detainers acting successively in each stitch-forming cycle to seize thread-loops from said loopers and detain said thread-loops for entry by said means after the loopers have been retracted.

In testimony whereof we have signed our names to this specification.

EDWARD B. ALLEN.
HAROLD C. FAULKNER.